(12) United States Patent
Jeon et al.

(10) Patent No.: US 9,298,291 B2
(45) Date of Patent: Mar. 29, 2016

(54) TOUCH SCREEN PANEL AND MANUFACTURING METHOD THEREFOR

(71) Applicant: LG ELECTRONICS INC., Seoul (KR)

(72) Inventors: Seongman Jeon, Seoul (KR); Jongkyu Kim, Seoul (KR); Joodo Park, Anyang (KR); Seehyung Lee, Seoul (KR); Yongdae Kim, Seongnam (KR)

(73) Assignees: LG ELECTRONICS INC., Seoul (KR); POSTECH ACADEMY-INDUSTRY FOUNDATION, Pohang-Si (KR)

( * ) Notice: Subject to any disclaimer, the term of this patent is extended or adjusted under 35 U.S.C. 154(b) by 380 days.

(21) Appl. No.: 13/731,460

(22) Filed: Dec. 31, 2012

(65) Prior Publication Data

US 2013/0278514 A1    Oct. 24, 2013

(30) Foreign Application Priority Data

Apr. 23, 2012 (KR) .................. 10-2012-0042268

(51) Int. Cl.
*G02F 1/1333* (2006.01)
*G06F 3/041* (2006.01)

(52) U.S. Cl.
CPC ............ *G06F 3/041* (2013.01); *G02F 1/13338* (2013.01); *G06F 2203/04103* (2013.01); *Y10T 29/49105* (2015.01)

(58) Field of Classification Search
CPC ... G02F 1/13338; G06F 3/0412; G06F 3/046; G06F 3/041; G06F 3/044; G06F 3/045
See application file for complete search history.

(56) References Cited

U.S. PATENT DOCUMENTS

| 8,094,247 | B2 | 1/2012 | Allemand et al. | |
|---|---|---|---|---|
| 2006/0262236 | A1* | 11/2006 | Abileah | 349/12 |
| 2007/0236618 | A1* | 10/2007 | Maag et al. | 349/12 |
| 2008/0314626 | A1* | 12/2008 | Moore | 174/255 |

* cited by examiner

*Primary Examiner* — Jessica M Merlin
(74) *Attorney, Agent, or Firm* — Birch, Stewart, Kolasch & Birch, LLP (57) ABSTRACT

A touch screen panel and a manufacturing method thereof are provided, which can reduce the surface reflectance (Fresnel reflectance) of a touch screen in indoor and outdoor environments, suppress degradation of the visibility of a display by a reduction in surface reflectance, and improve light transmittance. The touch screen panel includes: a first transparent substrate; a transparent conductive layer formed on the first transparent substrate, and having an electrode pattern of nanorods; a transparent adhesive layer formed on the transparent conductive layer; and a second transparent substrate formed on the transparent adhesive layer.

13 Claims, 4 Drawing Sheets

|  | AVERAGE REFLECTANCE(%) (400~700nm) | BOUNDARY REFLECTANCE Δ(%) | LIGHT TRANSMITTANCE(%) ASTM | HAZE(%) |
|---|---|---|---|---|
| GLASS | 7.4 | - | 93.05 | 0.23 |
| ITO THIN FILM ON GLASS | 8.6 | 1.2 | 91.8 | 0.45 |
| ITO NANO ROD ON GLASS | 8.0 | 0.6 | 92.7 | 0.27 |

FIG. 6

TOUCH SCREEN PANEL AND MANUFACTURING METHOD THEREFOR

CROSS-REFERENCE TO RELATED APPLICATION

Pursuant to 35 U.S.C. §119(a), this application claims the benefit of earlier filing date and right of priority to Korean Application No. 10-2012-0042268, filed on Apr. 23, 2012, the contents of which is incorporated by reference herein in its entirety.

BACKGROUND OF THE INVENTION

1. Field of the Invention

The present specification relates to a touch screen panel and a manufacturing method thereof.

2. Description of the Background Art

In general, a touch screen panel according to the conventional art is an input device capable of replacing an input device, such as a mouse or keyboard, by which a user can input desired information directly on the screen with a finger while viewing the screen.

SUMMARY OF THE INVENTION

A touch screen panel according to an embodiment of the present invention includes: a first transparent substrate; a transparent conductive layer formed on the first transparent substrate, and having an electrode pattern of nanorods; a transparent adhesive layer formed on the transparent conductive layer; and a second transparent substrate formed on the transparent adhesive layer.

In an example related to the present invention, the touch screen panel may further include a first antireflective layer formed on the second transparent substrate.

In an example related to the present invention, the touch screen panel may further include a second antireflective layer formed on the transparent substrate, the second antireflective layer being formed on a first surface of both surfaces of the first transparent substrate, and the transparent conductive layer being formed on a second surface of the both surfaces of the first transparent substrate.

In an example related to the present invention, the touch screen panel may further include an LCD (liquid crystal display) panel positioned on the touch screen panel.

In an example related to the present invention, the LCD panel may include: a first polarizer; liquid crystals formed on the first polarizer; a second polarizer formed on the liquid crystals; and a third antireflective layer formed on the second polarizer.

In an example related to the present invention, the transparent conductive layer may have a reflective index between the refractive index of the first transparent substrate and the refractive index of the transparent adhesive layer.

In an example related to the present invention, the first antireflective layer may have a refractive index between the refractive index of the first transparent substrate and the refractive index of an air layer.

In an example related to the present invention, the second antireflective layer may have a refractive index between the refractive index of the second transparent substrate and the refractive index of the air layer.

In an example related to the present invention, the third antireflective layer may have a refractive index between the refractive index of the second polarizer and the refractive index of the air layer.

In an example related to the present invention, the refractive indexes of the first transparent substrate, transparent conductive layer, transparent adhesive layer, and second transparent substrate may be all equal or similar to each other.

A manufacturing method of a touch screen panel according to an embodiment of the present invention may include the steps of: forming a transparent conductive layer having an electrode pattern of nanorods on a first transparent substrate; forming a transparent adhesive layer on the transparent conductive layer; and forming a second transparent substrate on the transparent adhesive layer.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

The technical terms used in the present specification are set forth to mention specific embodiments of the present invention, and do not intend to define the scope of the present invention. As far as not being defined differently, all terms used herein including technical or scientific terms may have the same meaning as those generally understood by an ordinary person skilled in the art to which the present disclosure belongs to, and should not be construed in an excessively comprehensive meaning or an excessively restricted meaning. In addition, if a technical term used in the description of the present disclosure is an erroneous term that fails to clearly express the idea of the present disclosure, it should be replaced by a technical term that can be properly understood by the skilled person in the art. In addition, general terms used in the description of the present disclosure should be construed according to definitions in dictionaries or according to its front or rear context, and should not be construed to have an excessively restrained meaning.

A singular representation may include a plural representation as far as it represents a definitely different meaning from the context. Terms 'include' or 'has' used herein should be understood that they are intended to indicate an existence of several components or several steps, disclosed in the specification, and it may also be understood that part of the components or steps may not be included or additional components or steps may further be included.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

Preferred embodiments of the present invention will be described below in detail with reference to the accompanying drawings where those components are rendered the same reference number that are the same or are in correspondence, regardless of the figure number, and redundant explanations are omitted.

In describing the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings.

Figure 1:
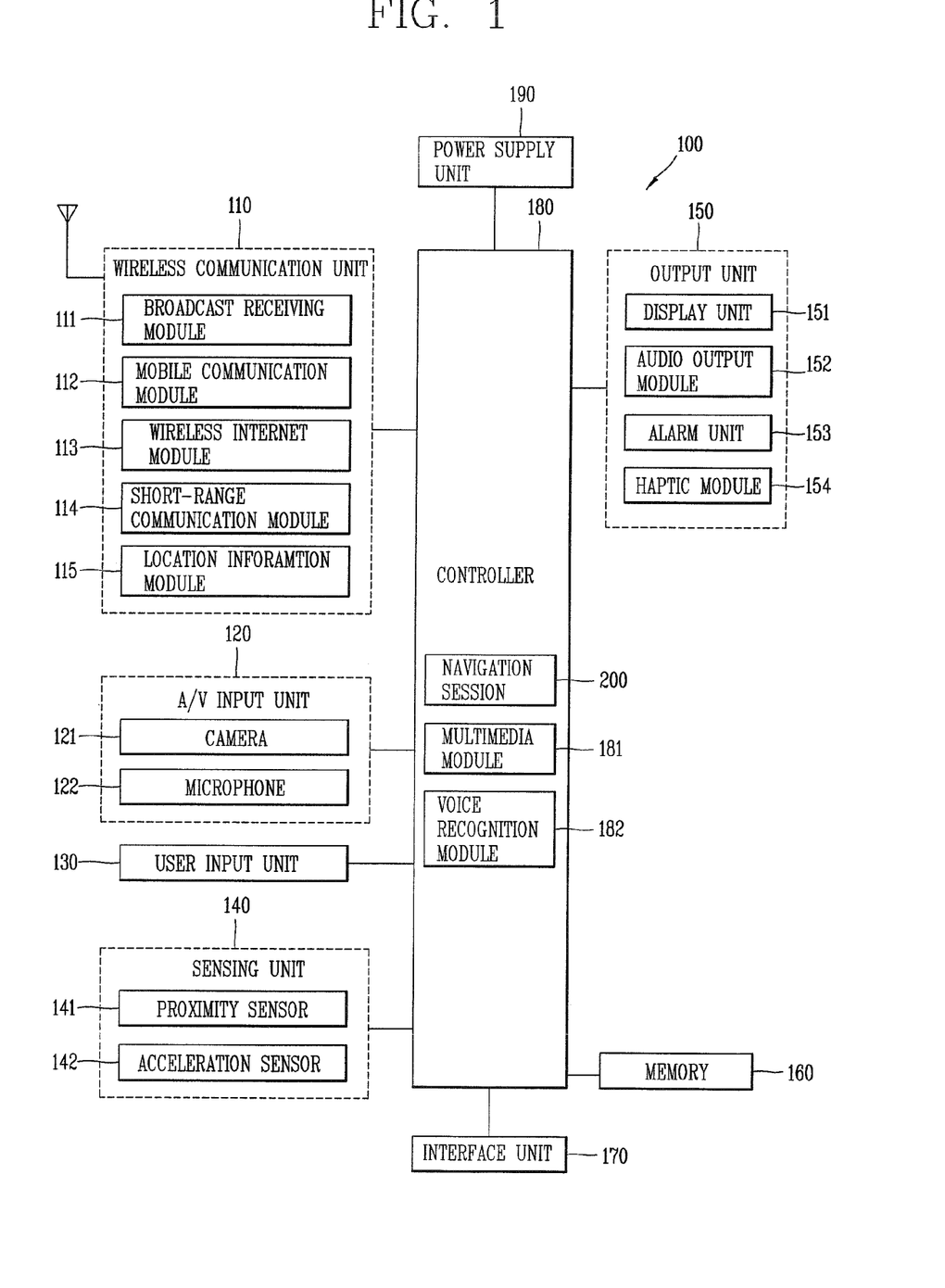
FIG. 1 is a view showing the configuration of a mobile communication terminal employing a touch screen panel according to embodiments of the present invention.

Hereinafter, a touch screen panel and a manufacturing method thereof will be described with reference to FIGS. 1 to 5, which can reduce the surface reflectance (Fresnel reflectance) of a touch screen in indoor and outdoor environments, suppress degradation of the visibility of a display by a reduction in surface reflectance, and improve light transmittance FIG. 1 is a view showing the configuration of a mobile communication terminal 100 employing a touch screen panel according to embodiments of the present invention. The mobile communication terminal (phone) 100 may be implemented in various types. For instance, the mobile communication terminal 100 may include a portable phone, a smart phone, a notebook computer, a digital broadcasting terminal, Personal Digital Assistants (PDA), Portable Multimedia Player (PMP), etc.

As shown in FIG. 1, the mobile communication terminal 100 may include a wireless communication unit 110, an Audio/Video (A/V) input unit 120, a user input unit 130, a sensing unit 140, an output unit 150, a memory 160, an interface unit 170, a control unit 180, a power supply unit 190 and the like.

However, all of the constitutional components of the mobile communication terminal 100 shown in FIG. 1 are not a prerequisite constitutional component. The mobile communication terminal 100 can be implemented using constitutional components more than or less than the constitutional components shown in FIG. 1.

The wireless communication unit 110 may include one or more constitutional components allowing wireless communication between the mobile communication terminal 100 and a wireless communication system or between the mobile communication terminal 100 and a network in which the mobile communication terminal 100 is located. For example, the wireless communication unit 110 may include a broadcasting receiver module 111, a mobile communication module 112, a wireless Internet module 113, a short-range communication module 114, a location information module 115, and the like.

The broadcasting receiver module 111 receives broadcasting signals and/or broadcasting-related information from an external broadcasting management server through a broadcasting channel. The broadcasting channel may include a satellite channel and a terrestrial wave channel. The broadcasting management server may be a server which generates and transmits the broadcasting signals or the broadcasting-related information, or a server which receives and transmits previously generated broadcasting signals or broadcasting-related information to the mobile communication terminal 100. The broadcasting-related information may be information related to a broadcasting channel, a broadcasting program, or a broadcasting service provider. The broadcasting signal may include a TV broadcasting signal, a radio broadcasting signal, a data broadcasting signal, and a broadcasting signal of a form in which a data broadcasting signal is combined to the TV broadcasting signal or the radio broadcasting signal.

The broadcasting related information may be provided even through a mobile communication network and in this case, may be received by the mobile communication module 112. The broadcasting related information may exist in various forms. For example, the broadcasting related information may exist in a form such as Electronic Program Guide (EPG) of Digital Multimedia Broadcasting (DMB) or Electronic Service Guide (ESG) of Digital Video Broadcast-Handheld (DVB-H).

The broadcasting receiver module 111 receives a broadcasting signal using various broadcasting systems, and can receive a digital broadcasting signal using a digital broadcasting system such as particularly, Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), and Integrated Services Digital Broadcast-Terrestrial (ISDB-T). Further, the broadcasting receiver module 111 can be formed to be suitable to all broadcasting systems for providing a broadcasting signal, as well as the above-mentioned digital broadcasting system. A broadcasting signal and/or broadcasting related information received through the broadcasting receiver module 111 can be stored in the memory 160.

The mobile communication module 112 transmits and receives radio signals to and from at least one of a base station, an external terminal and a server. Such radio signals may include a voice call signal, a video call signal, or various types of data according to text/multimedia message transmission and reception.

The wireless Internet module 113 refers to a module for a wireless Internet access. This module may be internally or externally coupled to the mobile communication terminal 100. The wireless Internet technique may include a WLAN (Wireless LAN) (Wi-Fi), Wibro (Wireless broadband), Wimax (World Interoperability for Microwave Access), HSDPA (High Speed Downlink Packet Access), etc.

The short-range communication module 114 refers to a module for short-range communication. As the short range communication technologies, Bluetooth, radio frequency identification (RFID), infrared data association (IrDA), ultra-wideband (UWB), ZigBee, etc., may be used.

The location information module 115 is a module for checking or acquiring the location of a mobile terminal (to check the location of a vehicle equipped with the mobile terminal). For example, the location information module 115 may include a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information, as well as the location of the latitude, longitude and altitude values, from the location information received from the satellites. As the location information module 115, a Wi-Fi positioning system and/or a hybrid positioning system may be used.

Further, the location information module 115 may include a geomagnetic sensor and/or gravity sensor for detecting a direction. For example, the location information module 115 may detect the direction of the mobile communication terminal 100 (for example, east, west, south and north) to implement navigation using augmented reality through the geomagnetic sensor (electronic compass). The location information module 115 may detect in which direction gravity acts through the gravity sensor (G-sensor), and display a vertical screen when the user holds the mobile communication terminal 100 in a vertical direction and automatically rotate the screen when the user holds it in a horizontal direction to display a wide screen. Furthermore, when the user views a video, the location information module 115 rotates the screen according to a direction of the mobile communication terminal 100 held by the user through the gravity sensor (G-sensor), thereby allowing the user to view an image in a convenient manner.

The A/V (audio/video) input unit 120 receives an audio or video signal, and includes a camera 121 and a microphone 122. The camera 121 processes an image frame, such as still picture or video, obtained by an image sensor in a video phone call or image capturing mode. The processed image frame can then be displayed on a display unit 151.

The image frames processed by the camera 121 may be stored in the memory 160 or transmitted through the wireless communication unit 110. Two or more cameras 121 may also be provided according to the configuration type of the mobile terminal 100.

The microphone 122 receives an external audio signal in a phone call mode, a recording mode, a voice recognition mode, and the like, and processes the audio signal into electrical voice data. The processed voice data can then be converted and output into a format capable of being transmitted to a mobile communication base station through the mobile communication module 112 in the phone call mode. The microphone 122 may also implement various types of noise canceling algorithms to cancel noise generated in a procedure of receiving the external audio signal.

The user input unit 130 generates input data to control an operation of the mobile terminal. The user input unit 130 may be configured by including a keypad, a dome switch, a touch pad (pressure/capacitance), a jog wheel, a jog switch, and the like. Particularly, when the touch pad forms an interlayer structure together with the display unit 151, the user input unit 130 may be called a touch screen.

The sensing unit 140 detects a current status of the mobile communication terminal 100 such as an opened or closed state of the mobile communication terminal 100, a location of the mobile communication terminal 100, the presence or absence of user contact, an orientation of the mobile communication terminal 100, an acceleration or deceleration movement of the mobile communication terminal 100, and the like, and generates a sensing signal for controlling the operation of the mobile communication terminal 100. For example, when the mobile communication terminal 100 is a slide phone type, the sensing unit 140 can sense an opened or closed state of the slide phone. Furthermore, the sensing unit 140 takes charge of a sensing function associated with whether or not power is supplied from the power supply unit 190, whether or not an external device is coupled with the interface unit 170.

The interface unit 170 performs a role of interfacing with all external devices connected to the mobile communication terminal 100. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like. Here, the identification module may be configured as a chip for storing various information required to authenticate an authority for using the mobile communication terminal 100, which may include a User Identity Module (UIM), a Subscriber Identity Module (SIM), a Universal Subscriber Identity Module (USIM), and the like. Also, the device provided with the identification module (identification device') may be implemented as a smart card. Hence, the identification module can be coupled to the mobile communication terminal 100 via a port. The interface unit 170 may receive data or power from an external device and transfer the received data or power to each constituent element in the mobile communication terminal 100, or transmit data within the mobile communication terminal 100 to the external device.

The output unit 150 is configured to provide an output for audio signal, video signal, or alarm signal, and the output unit 150 may include the display unit 151, an audio output module 152, an alarm unit 153, and the like.

The display unit 151 displays or outputs information processed in the mobile communication terminal 100. For example, when the mobile communication terminal 100 is in a phone call mode, the display unit 151 can display a User Interface (UI) or a Graphic User Interface (GUI) associated with a call. When the mobile communication terminal 100 is in a video call mode or image capturing mode, the display unit 151 can display a captured image and/or received image, a UI or GUI.

The display unit 151 may also include at least one of a Liquid Crystal Display (LCD), a Thin Film Transistor-LCD (TFT-LCD), an Organic Light Emitting Diode (OLED) display, a flexible display, and a three-dimensional (3D) display. Furthermore, two or more display units 151 may be provided depending on the implementation form of the mobile communication terminal 100. For example, an external display unit (not shown) and an internal display unit (not shown) can be provided in the mobile communication terminal 100.

When the display unit 151 and a sensor for detecting a touch operation ('touch sensor') are formed with an interlayer structure ('touch screen'), the display unit 151 may be also used as an input device, in addition to an output device. The touch sensor may be configured in the form of, for example, touch film, touch sheet, touch pad, or the like. Furthermore, the touch sensor may be configured to convert a change such as pressure applied to a specific area of the display unit 151 or capacitance generated on a specific area of the display unit 151 into an electrical input signal. The touch sensor may be configured to detect a touch input pressure, as well as a touch input position and a touch input area. When there is a touch input to the touch sensor, a signal (or signals) corresponding to the touch input is sent to a touch controller (not shown). The touch controller processes the signal (or signals) and then sends the corresponding data to a control unit 180. By this, the control unit 180 can detect whether or not any region is touched on the display unit 151. A proximity-touch means a state that a pointer approaches to a screen while being apart a predetermined distance from the screen without actually touching the screen.

The proximity sensor 141 may be arranged in an inner region of the mobile terminal 100 surrounded by a touch screen or may be arranged adjacent to the touch screen. The proximity sensor 141 is a sensor for detecting the presence or absence of an object approaching to a certain detection surface or an object that exists nearby by using the force of electromagnetism or infrared rays without a mechanical contact. Thus, the proximity sensor 141 has a considerably longer life span compared with a contact type sensor and can be utilized for various purposes.

Examples of the proximity sensor 141 may include a transmission type photo sensor, a direct reflection type photo sensor, a mirror-reflection type photo sensor, an RF oscillation type proximity sensor, a capacitance type proximity sensor, a magnetic proximity sensor, an infrared proximity sensor, and the like. When the touch screen is an electrostatic type, the approach of a pointer can be detected based on a change in a field according to the approach of the pointer. In this instance, the touch screen (touch sensor) may be classified as a proximity sensor.

In the following description, for the sake of brevity, recognition of the pointer positioned to be close to the touch screen, although the pointer is not actually brought into contact with the touch screen, will be called a "proximity touch", while recognition of actual contacting of the pointer on the touch screen will be called a "contact touch". The position where the pointer is proximately touched on the touch screen means a position where the pointer is positioned to correspond vertically to the touch screen when the pointer is proximately touched.

The proximity sensor 141 can detect a proximity touch, and a proximity touch pattern (for example, a proximity touch distance, a proximity touch direction, a proximity touch speed, a proximity touch time, a proximity touch position, a proximity touch movement state, or the like). Information corresponding to the detected proximity touch operation and the proximity touch pattern can be output to the touch screen.

The sensing unit 140 also includes an acceleration sensor 142. The acceleration sensor 142 is a device for transforming an acceleration change in any one direction into an electrical signal, which is widely used with the development of microelectromechanical systems (MEMS) technology. There are various kinds of acceleration sensors 142 including one that is built in an airbag system of a vehicle to measure a large value of acceleration used to detect collision and one that measures a small value of acceleration used as an input means to recognize a slight motion of a human hand. The acceleration sensor 142 is generally configured by providing two or three axes in a package, and may use only one z-axis in some instances. Accordingly, when the x-axis or y-axis acceleration sensor is used instead of the z-axis acceleration sensor, the acceleration sensor can be placed upright on a main substrate using a separate piece of substrate.

The audio output module 152 outputs audio data received from the wireless communication unit 110 or stored in the memory 160 in a call signal reception mode, a call mode, a record mode, a voice recognition mode, a broadcast reception mode, and the like. Also, the audio output module 152 can output an audio signal associated with the function performed by the mobile communication terminal 100 (for example, a call signal reception sound, a message reception sound, etc.). The audio output module 152 may also include a receiver, a speaker, a buzzer, and the like.

The alarm unit 153 outputs a signal to notify of the occurrence of an event of the mobile terminal 100. Examples of events that could occur in the mobile terminal 100 include call signal reception, message reception, a key signal input, and the like. The alarm unit 153 may output a signal for notifying of the occurrence of an event in a form other than an audio signal or a video signal. For example, the alarm unit 153 can output a signal in the form of vibration. When a call signal or message is received, the alarm unit 153 can vibrate the mobile terminal 100 by vibration means. When a key signal is input, the alarm unit 153 can vibrate the mobile terminal 100 by vibration means to give feedback to the key signal input. Thus, the user can recognize the occurrence of an event through vibration as described above. The signal for notifying of the occurrence of the event may also be output through the display unit 151 or the audio output module 152.

The haptic module 154 generates various tactile effects felt by the user. A typical example of the tactile effects generated by the haptic module 154 is vibration. An intensity, pattern, or the like of vibration generated by the haptic module 154 can also be controlled. For example, different vibrations may be combined and output, or sequentially output.

The haptic module 154, in addition to vibration, can generate various tactile effects, including an effect by stimulation such as a pin arrangement vertically moving against the contacted skin surface, an ejection or suction force of air through the ejection or suction port, a brush against the skin surface, a contact of the electrode, electrostatic force, or the like, or an effect by reproduction of thermal sense using a heat absorption or generation device.

The haptic module 154 may also be implemented to feel a tactile effect through muscular senses by a finger or arm of the user, as well as to transfer a tactile effect through direct contact. Two or more haptic modules 154 may also be used according to a configuration of a telematics terminal. The haptic module 154 may be provided at a place frequently being contacted by the user in a vehicle. For example, the haptic module 154 may be provided on a steering wheel, a gearshift lever, a seat, or the like.

The memory 160 stores software programs for processing and controlling the control unit 180, or temporarily stores data (for example, a phonebook, message, still image, video, and the like) which are input and/or output.

The memory 160 may include at least one type of storage medium including a flash memory type, a hard disk type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, and the like. Also, the mobile communication terminal 100 may operate a web storage that performs the storage function of the memory 160 on the Internet.

The interface unit 170 serves as an interface to every external device that may be connected with the mobile terminal 100. For example, the interface unit 170 may include a wired or wireless headset port, an external battery charger port, a wired or wireless data port, a memory card port, a port for connecting a device having an identification module, an audio input/output (I/O) port, a video input/output (I/O) port, an earphone port, and the like. Here, the identification module, as a chip that stores various data for authenticating the authority to use the mobile terminal 100, may include a user identity module (UIM), a subscriber identity module (SIM), a universal subscriber identity module (USIM), and the like. In addition, the device having the identification module (identification device) may be made in a form of smart card. Accordingly, the identification device may be connected with the mobile terminal 100 through a port. The interface unit 170 is provided to receive data or power from an external device and transfer the received data or power to every element within the mobile terminal 100 or may be used to transfer data within the mobile terminal 100 to an external device.

When the mobile terminal 100 is connected with an external cradle, the interface unit 170 serves as a conduit to allow power from the cradle to be supplied therethrough to the mobile terminal 100, or serves as a conduit to allow various command signals input from the cradle to be transferred to the mobile terminal 100 therethrough. Various command signals or the power input from the cradle may operate as a signal for recognizing when the mobile terminal 100 is properly mounted on the cradle.

The control unit 180 generally controls a general operation of the mobile communication terminal 100. For example, the control unit 180 performs a control and processing operation associated with a voice call, data communication, a video phone call, and the like. In addition, the control unit 180 includes a multimedia module 181 for reproducing multimedia content. The multimedia module 181 may be provided within the control unit 180, or may be separately provided from the control unit 180.

The control unit 180 can perform pattern recognition processing to recognize handwriting or picture-drawing input performed on the touch screen as a character or image, respectively.

The power supply unit 190 receives external or internal power to supply the power used for an operation of each element under a control of the control unit 180.

The function of an element applied to the mobile communication terminal 100 may be implemented in a computer-readable medium using software, hardware, or any combination thereof. For a hardware implementation, the function may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units designed to perform the functions described herein. In some instances, such embodiments may be implemented in the control unit 180. For a software implementation, the embodiments such as procedures or functions may be implemented together with separate software modules that allow performing of at least one function or operation. Software codes can be implemented by a software application written in any suitable programming language. The software codes may be stored in the memory 160 and executed by the control unit 180.

In addition, the voice recognition module 182 recognizes speech uttered by a user, and performs a relevant function based on the recognized voice signal.

A navigation session 200 applied to the mobile communication terminal 100 displays a travel path on map data.

For hardware implementation, the processes may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units designed to perform the functions described herein. In some cases, such processes may be implemented by the control unit 180.

For software implementation, the processes, such as procedures or functions, may be implemented together with separate software modules that allow performing of at least one function or operation. Software codes can be implemented by a software application (or program) written in any suitable programming language. The software codes may be stored in the memory 160 and executed by the control unit 180.

An audio recognition module 182 is configured to recognize an audio signal generated from a user, and to execute a corresponding function according to the recognized audio signal.

The touch screen panel applied to the display unit 151 of the mobile communication terminal 100 according to the embodiments of the present invention may include: a first transparent substrate; a transparent conductive layer formed of a plurality of nanorods (nanowires) on the first transparent substrate; a transparent adhesive layer formed on the transparent conductive layer; and a second transparent substrate (or window layer) formed on the transparent adhesive layer.

A detailed description of the components of the touch screen panel applied to the display unit 151 of the mobile communication terminal 100 according to the embodiments of the present invention will be described with reference to FIGS. 2 to 5.

Figure 2:
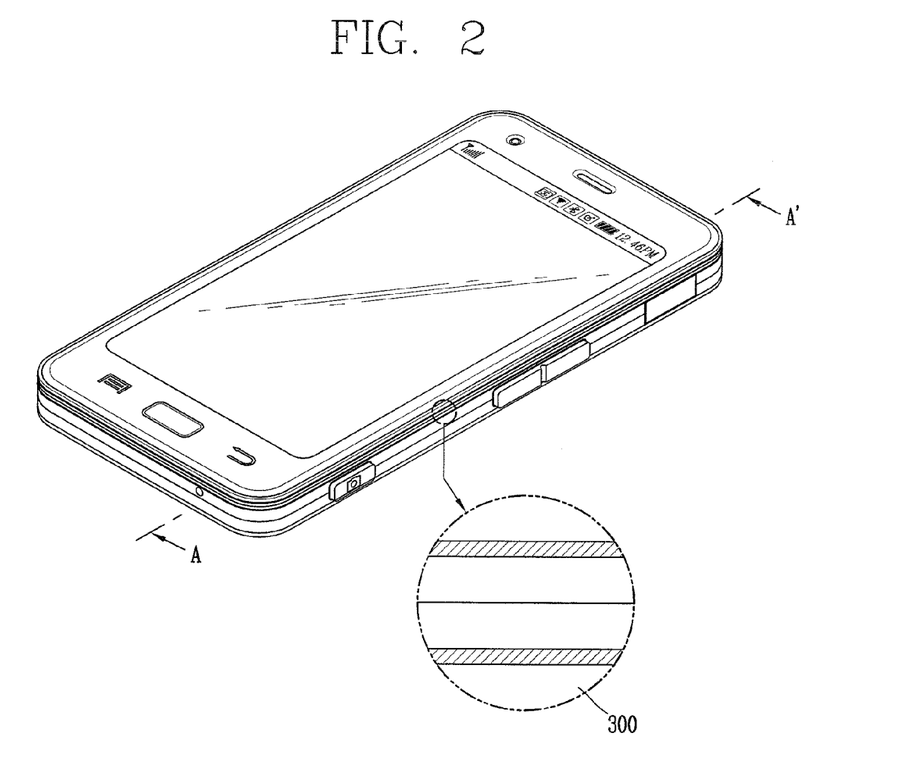
FIG. 2 is a view schematically showing the touch screen panel applied to the mobile communication terminal according to the embodiments of the present invention.

FIG. 2 is a view schematically showing the touch screen panel applied to the mobile communication terminal 100 according to the embodiments of the present invention, which shows the structure of the touch screen panel taken along line A-A'.

A touch screen panel of a terminal and a manufacturing method thereof according to exemplary embodiments of the present invention will now be described with reference to FIGS. 3 to 5. The touch screen panel of the terminal and the manufacturing method thereof according to exemplary embodiments of the present invention is applicable to various terminals such as a smart phone, a notebook computer, a personal digital assistant (PDA), and a portable multimedia player (PMP), as well as to mobile communication terminals such as the mobile communication terminal 100, a telematics terminal, and a navigation system and video devices such as a television.

Figure 3:
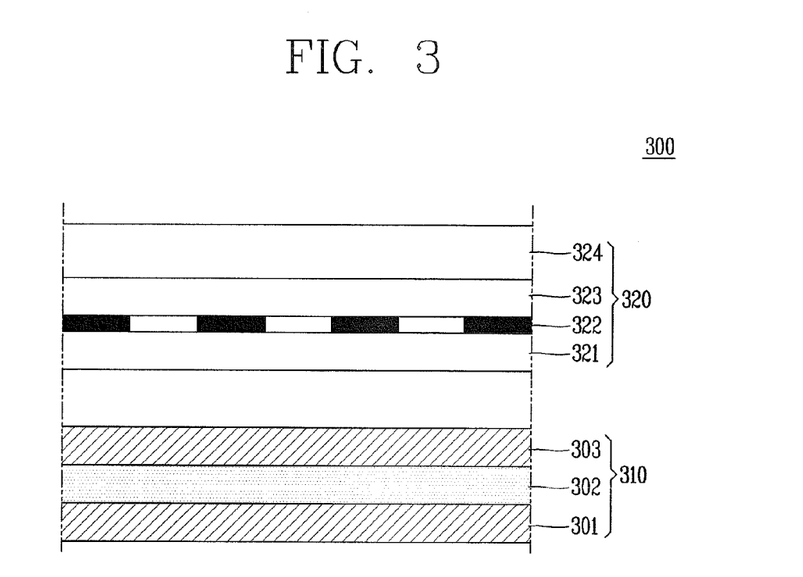
FIG. 3 is a view showing the configuration of a touch screen panel according to an exemplary embodiment of the present invention.

FIG. 3 is a cross-sectional view taken along line A-A' of FIG. 2, which shows the configuration of a touch screen panel according to an embodiment of the present invention.

As shown in FIG. 3, the touch screen panel 320 according to the embodiment of the present invention includes: a transparent substrate 321; a transparent conductive layer 322 formed on the transparent substrate 321 and having an electrode pattern of a plurality of nanorods (nanowires); a transparent adhesive layer 323 formed on the transparent conductive layer 322; and a window layer (or transparent substrate) 324 formed on the transparent adhesive layer 323. The transparent conductive layer 322 may be formed on the top or bottom surface of the transparent substrate 321, or on the top and bottom of the transparent substrate 321.

The transparent substrate 321 may be formed of a light-transmissive material, such as glass, crystal, or plastic material such as polymethyl methacrylate (PMMA).

The transparent conductive layer 322 may be a transparent conductive layer, such as an ITO (indium tin oxide) layer (or ITO film) having an electrode pattern of a plurality of nanorods (or nanowires).

The transparent adhesive layer may be an OCA (Optical Clear Adhesive) layer.

The window layer may be formed of a light-transmissive material, such as glass, crystal, or plastic material such as polymethyl methacrylate (PMMA).

The touch screen panel 320 is positioned on an LCD (liquid crystal display) panel 310 by a support (not shown), with an air layer interposed therebetween. The LCD panel 310 includes a first polarizer 301, liquid crystals 302 formed on the first polarizer 301, and a second polarizer 303 formed on the liquid crystals 302. The operation and structure 301, 302, and 303 of the LCD panel 310 is a well-known art, so a detailed description thereof will be omitted. The LCD panel 310 and the touch screen panel 320 are included in the display of the terminal, and the display may be an electrostatic-capacitive-type display or a transmissive electrostatic-capacitive-type display.

The transparent conductive layer 322 may have a refractive index (n=1.59 to 1.49) between the refractive index of the transparent substrate 321 and the refractive index of the transparent adhesive layer 323, in order to reduce the Fresnel reflectance of external light and improve the visibility of the display of the terminal. For example, the transparent conductive layer 322 may have an average value (e.g., n=1.5) of the refractive index (n) (e.g., n=1.5) of the transparent substrate and the refractive index (e.g., n=1.5) of the transparent adhesive layer 323.

The refractive index (n) of the transparent substrate 321 and the refractive index (n) of the transparent adhesive layer 323 may range from 1.59 to 1.49.

If the electrode pattern of the transparent conductive layer is formed in the form of a thin film, the refractive index of the transparent conductive layer is approximately 2.0; whereas, if the electrode pattern of the transparent conductive layer is formed in the form of nanorods (or nanowires), the refractive index of the transparent conductive layer ranges from 1.59 to 1.49. Accordingly, the electrode pattern of the transparent conductive layer 322 is formed in the form of nanorods (or nanowires), whereby the refractive index of the transparent conductive layer 322 is equal or similar to the refractive index (n=1.59 to 1.49) of two materials (e.g., the transparent substrate and the transparent adhesive layer) neighboring the transparent conductive layer 322.

Due to the electrode pattern of the nanorods (or nanowires) of the transparent conductive layer 322, the reflectance of external light of the transparent conductive layer 322 decreases from the range of 3%-4% to the range of 1%~0%.

The refractive index (n) of the transparent substrate may range approximately from 1.59 to 1.49, the refractive index (n) of the transparent conductive layer may range approximately from 1.59 to 1.49, the refractive index (n) of the transparent adhesive layer may range approximately from 1.59 to 1.49, and the refractive index (n) of the window layer may range approximately from 1.59 to 1.49. That is, Fresnel reflectance may be reduced by making the refractive indexes of the components 321, 322, 323, and 324 of the touch screen panel 320 equal, or the refractive indexes of the components 321, 322, 323, and 324 of the touch screen panel 320 may be made similar by reducing Fresnel reflectance and taking into account (cutting down) the manufacturing cost of the touch screen panel.

The refractive index of each of the thin film materials 321, 322, and 324 may be adjusted by changing the deposition angle as in oblique angle evaporation. The technique of changing the refractive index of a thin film material by changing the deposition angle is a well-known art, so a detailed description thereof will be omitted.

Hereinafter, a manufacturing method of the touch screen panel 320 according to an embodiment of the present invention will be described with reference to FIG. 3.

First of all, the transparent conductive layer 322 is formed on the transparent substrate 321. For example, an ITO film 322 having an electrode pattern of nanorods (or nanowires) is formed on a glass substrate 321, or an ITO layer 322 having an electrode pattern of nanorods (or nanowires) is deposited on the glass substrate 321.

Although the ITO (indium tin oxide) thin film is a highly conductive material in general, it deteriorates (increase in reflectance and decrease in transmittance) the optical characteristics of a touch screen panel or the like made with a transparent conductive layer due to its high refractivity. Accordingly, various refractive indexes (e.g., 2.19 to 1.17) can be obtained by forming a nanorod layer consisting of rods of several tens to several hundreds of nano size, as shown in FIG. 4, rather than by forming the ITO film as a thin film.

Figure 4:
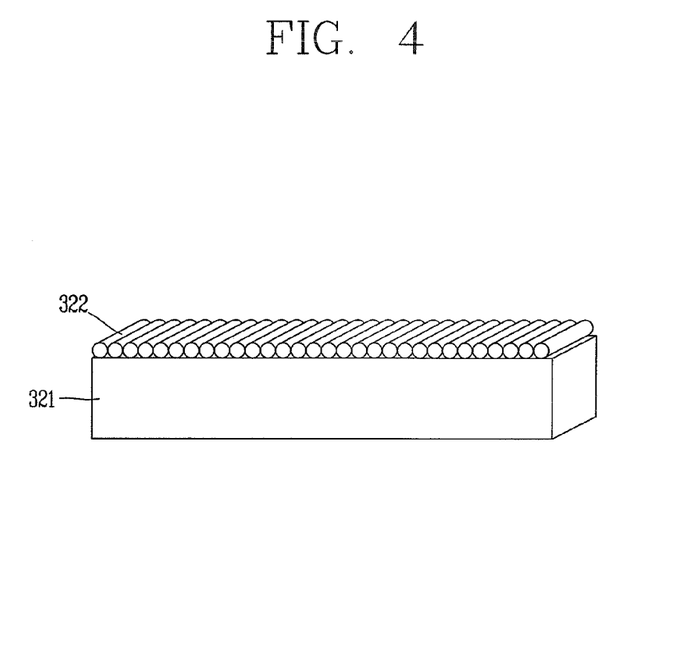
FIG. 4 is an enlarged view schematically showing a transparent conductive layer of a touch screen panel according to an embodiment of the present invention.

FIG. 4 is an enlarged view schematically showing a transparent conductive layer of a touch screen panel according to an embodiment of the present invention.

As shown in FIG. 4, the transparent conductive layer 322 formed on the transparent substrate 321 has an electrode pattern of rods of several tens to several hundreds of nano size. Here, the electrode pattern of nanorods may be formed by E-beam deposition or sputtering deposition.

Figure 5:
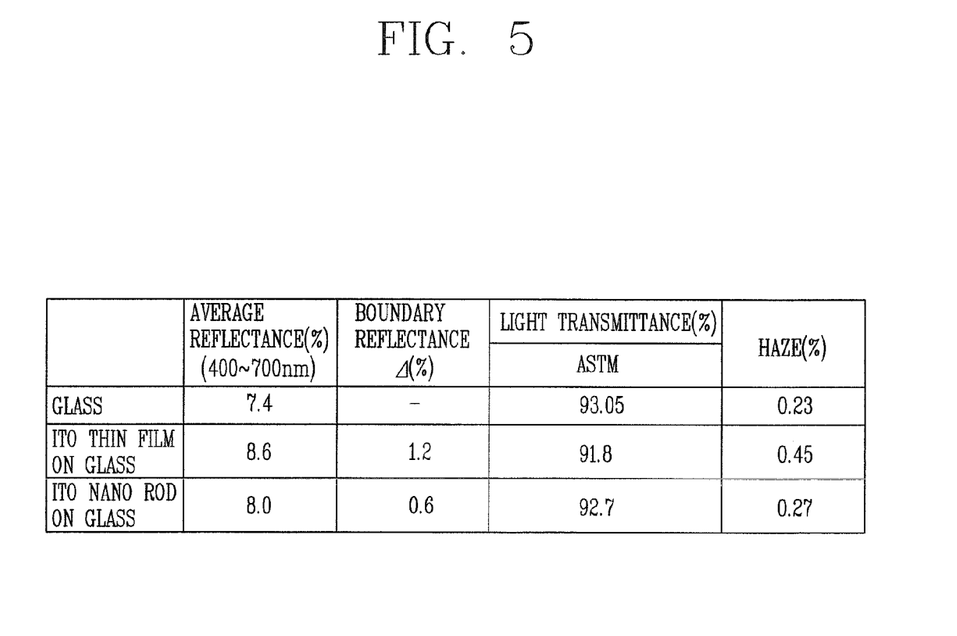
FIG. 5 is a view showing a table comparing the light characteristics of a transparent conductive layer according to an embodiment of the present invention and a transparent conductive layer according to the conventional art.

FIG. 5 is a view showing a table comparing the light characteristics of a transparent conductive layer according to an embodiment of the present invention and a transparent conductive layer according to the conventional art.

As shown in FIG. 5, the average reflectance (%) of an ITO layer (conventional ITO layer) having the form of a thin film formed on glass is 8.6% at a thickness of 400 to 700 nm; whereas the average reflectance of an ITO layer (ITO layer of the present invention) of nanorods formed on glass is 8.0% at a thickness of 400 to 700. From this, it can be found out that the average reflectance of the ITO layer of the present invention is improved, compared to the average reflectance of the conventional ITO layer.

While the boundary reflectance Δ(%) of the conventional ITO layer is 1.2, the boundary reflectance Δ(%) of the ITO layer of the present invention is 0.6%. From this, it can be found out that the boundary reflectance of the ITO layer of the present invention is reduced, compared to the boundary reflectance of the conventional ITO layer.

While the light transmittance (%) of the conventional ITO layer is 91.8%, the light transmittance of the ITO layer of the present invention is 92.7. From this, it can be found out that the light transmittance of the ITO layer of the present invention is improved, compared to the light transmittance of the conventional ITO layer.

While the haze of the conventional ITO layer is 0.45, the haze of the ITO layer of the present invention is 0.27. From this, it can be found out that the haze of the conventional ITO layer is reduced, compared to the haze of the ITO layer of the present invention.

The transparent adhesive layer 323 is formed on the transparent conductive layer 322. For example, the OCA film 323 is formed on the transparent conductive layer 322, or the OCA (Optical Clear Adhesive) 323 is deposited on the ITO layer 322 by a typical deposition technique (e.g., rectangular deposition).

The window layer 324 is formed on the transparent adhesive layer 323. For example, glass 324 may; be formed on the OCA layer 323, or a glass composition may be deposited on the OCA layer 323 by a typical deposition technique (e.g., rectangular deposition).

Therefore, in the touch screen panel and the manufacturing method according to an embodiment of the present invention, a transparent conductive layer 322 having an electrode pattern of a plurality of nanorods (or nanowires) is formed on a transparent substrate, whereby the refractive indexes of the components of the touch screen panel may be made equal or similar to each other and the surface reflectance (Fresnel reflectance) of the touch screen under indoor and outdoor environments may be reduced. Such a reduction in surface reflectance may lead to higher visibility of the display and improved light transmittance.

Figure 6:
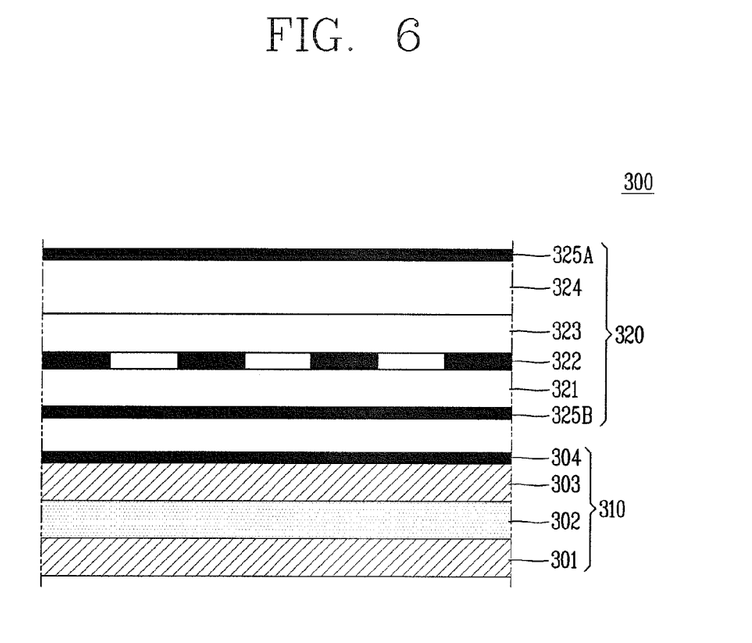
FIG. 6 is a view showing the configuration of a touch screen panel according to another embodiment of the present invention.

FIG. 6 is a cross-sectional view taken along line A-A' of FIG. 2, which shows the configuration of a touch screen panel according to another embodiment of the present invention.

As shown in FIG. 6, the touch screen panel 320 according to the embodiment of the present invention includes: a transparent substrate 321; a transparent conductive layer 322 formed on a first surface (e.g., top surface of the transparent substrate) of both surfaces of the transparent substrate 321, and having an electrode pattern of a plurality of nanorods (or nanowires); a transparent adhesive layer 323 formed on the transparent conductive layer 322, a window layer 324 formed on the transparent adhesive layer 323, a first antireflective layer (antireflective coating or antireflective film) 325A formed on the window layer (or transparent substrate) 324; and a second antireflective layer (antireflective coating or antireflective film) 325B formed on a second surface (bottom surface of the transparent substrate) of the both surfaces the transparent substrate 321.

The touch screen panel 320 is positioned on an LCD (liquid crystal display) panel 310 by a support (not shown), with an air layer interposed therebetween. The LCD panel 310 includes a first polarizer 301, liquid crystals 302 formed on the first polarizer 301, and a second polarizer 303 formed on the liquid crystals 302. The operation and structure 301, 302, and 303 of the LCD panel 310 is a well-known art, so a detailed description thereof will be omitted. On the other hand, the LCD panel 310 applied to the touch screen panel 320 according to the embodiments of the present invention may further include a third antireflective layer (antireflective coating or antireflective film) 325B formed on the second polarizer 303. The LCD panel 310 and the touch screen panel 320 are included in the display of the terminal, and the display may be an electrostatic-capacitive-type display or a transmissive electrostatic-capacitive-type display.

The first to third antireflective layers 304, 325A, and 325B may have a refractive index between the refractive indexes of two adjacent materials, in order to reduce the Fresnel reflectance of external light and improve the visibility of the display of the terminal. For example, the refractive index of the first antireflective layer 325A may be higher than the refractive index (e.g., 1) of the air layer and lower than the refractive index (e.g., an average value between the refractive index of the air layer and the refractive index of the window layer 324) of the window layer 324. The refractive index of the second antireflective layer 325B may be higher than the refractive index (e.g., 1) of the air layer and lower than the refractive index (e.g., an average value between the refractive index of the air layer and the refractive index of the transparent substrate 321) of the transparent substrate 321. The refractive index of the third antireflective layer 304 may be higher than the refractive index (e.g., 1) of the air layer and lower than the refractive index (e.g., an average value between the refractive index of the air layer and the refractive index of the second polarizer 303) of the second polarizer 303. The first antireflective layer 325A may be a film having a reflectance of approximately 1%, and the second and third antireflective layers 325B and 304 each may be a film having a reflectance of approximately 1% or less (e.g., 0.7%).

The transparent substrate 321 may be formed of a light-transmissive material, such as glass, crystal, or plastic material such as polymethyl methacrylate (PMMA).

The transparent conductive layer 322 may be a transparent conductive layer, such as an ITO (indium tin oxide) layer (or ITO film) having an electrode pattern having a matrix form. The transparent adhesive layer may be an OCA (Optical Clear Adhesive) layer. The window layer may be formed of a light-transmissive material, such as glass, crystal, or plastic material such as polymethyl methacrylate (PMMA).

The refractive index (n) of the transparent substrate may be approximately from 1.5, the refractive index (n) of the transparent conductive layer may be approximately 1.5, the refractive index (n) of the transparent adhesive layer may be approximately 1.5, and the refractive index (n) of the window layer may be approximately 1.5. That is, Fresnel reflectance may be reduced by making the refractive indexes of the components 321, 322, 323, and 324 of the touch screen panel 320 equal, or the refractive indexes of the components 321, 322, 323, and 324 of the touch screen panel 320 may be made similar by reducing Fresnel reflectance and taking into account (cutting down) the manufacturing cost of the touch screen panel.

The refractive index of each of the thin film materials 321, 322, 323, 324, 325A, 325B, and 304 may be adjusted by changing the deposition angle as in oblique angle evaporation. The technique of changing the refractive index of a thin film material by changing the deposition angle is a well-known art, so a detailed description thereof will be omitted. Also, the refractive index of each of the thin film materials 321, 322, 323, 324, 325A, 325B, and 304 may be adjusted by forming the thin film materials 321, 322, 323, 324, 325A, 325B, and 304 in a multilayer structure consisting of thin film layers having a higher reflective index (e.g., 1.6) and thin film layers having a lower refractive index (1.3 to 1.45). A variety of well-known process techniques for adjusting the refractive indexes of the thin film materials 321, 322, 323, 324, 325A, 325B, and 304 may be used.

Hereinafter, a manufacturing method of the touch screen panel 320 according to another embodiment of the present invention will be described with reference to FIG. 6.

First of all, the transparent conductive layer 322 is formed on the transparent substrate 321. For example, an ITO film 322 is formed on a glass substrate 321, or an ITO layer 322 is deposited on the glass substrate 321 by rectangular deposition.

The third antireflective layer 304 may be formed on the transparent substrate. For example, the transparent conductive layer 322 is formed on a first surface (e.g., top surface of the transparent substrate) of both surfaces of the transparent substrate 321, and the second antireflective layer 325B is formed on a second surface (bottom surface of the transparent substrate) of the both surfaces the transparent substrate 321.

The transparent adhesive layer 323 is formed on the transparent conductive layer 322 having an electrode pattern of a plurality of nanorods (or nanowires). For example, the OCA film 323 is formed on the transparent conductive layer 322, or the OCA (Optical Clear Adhesive) 323 is deposited on the ITO layer 322 by a typical deposition technique (e.g., rectangular deposition).

The window layer 324 is formed on the transparent adhesive layer 323. For example, glass 324 may; be formed on the OCA layer 323, or a glass composition may be deposited on the OCA layer 323 by a typical deposition technique (e.g., rectangular deposition).

The first antireflective layer 325A is formed on the window layer 324. For example, the first antireflective layer 325A may be formed on the glass substrate 324, or the first antireflective layer 325A may be deposited on the glass substrate 324 by a typical deposition technique (e.g., rectangular deposition).

The first to third antireflective layres may be formed of a dielectric material such as $SiO_2$ or a light-transmissive material, such as glass, crystal, or plastic material such as polymethyl methacrylate (PMMA).

Therefore, in the touch screen panel and the manufacturing method according to another embodiment of the present invention, a transparent conductive layer 322 having an electrode pattern of a plurality of nanorods (or nanowires) is formed on a transparent substrate, whereby the refractive indexes of the components of the touch screen panel may be made equal or similar to each other and the surface reflectance (Fresnel reflectance) of the touch screen under indoor and outdoor environments may be reduced. Such a reduction in surface reflectance may lead to higher visibility of the display and improved light transmittance.

Therefore, in the touch screen panel and the manufacturing method according to another embodiment of the present invention, components of the touch screen panel whose reflective indexes are all equal or similar to each other are formed, and antireflective layers having a reflective index between the refractive index of the air layer and the refractive index of the components of the touch screen panel are formed on the touch screen panel and/or the LCD panel, whereby the refractive indexes of the components of the touch screen panel may be made equal or similar to each other and the surface reflectance (Fresnel reflectance) of the touch screen under indoor and outdoor environments may be reduced. Such a reduction in surface reflectance may lead to higher visibility of the display and improved light transmittance.

As described above, in the touch screen panel and the manufacturing method according to embodiments of the present invention, a transparent conductive layer 322 having an electrode pattern of a plurality of nanorods (or nanowires) is formed on a transparent substrate, whereby the refractive indexes of the components of the touch screen panel may be made equal or similar to each other and the surface reflectance (Fresnel reflectance) of the touch screen under indoor and outdoor environments may be reduced. Such a reduction in surface reflectance may lead to higher visibility of the display and improved light transmittance.

In the touch screen panel and the manufacturing method according to another embodiment of the present invention, components of the touch screen panel whose reflective indexes are all equal or similar to each other are formed, and antireflective layers having a reflective index between the refractive index of the air layer and the refractive index of the components of the touch screen panel are formed on the touch screen panel and/or the LCD panel, whereby the refractive indexes of the components of the touch screen panel may be made equal or similar to each other and the surface reflectance (Fresnel reflectance) of the touch screen under indoor and outdoor environments may be reduced. Such a reduction in surface reflectance may lead to higher visibility of the display and improved light transmittance.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A touch screen panel comprising:
    a first transparent substrate having a first surface and a second surface opposite to the first surface;
    a transparent conductive layer formed on the first surface of the first transparent substrate, and having an electrode pattern of nanorods;
    a transparent adhesive layer formed on the transparent conductive layer;
    a second transparent substrate formed on the transparent adhesive layer;
    a first antireflective layer formed on the second transparent substrate; and
    a second antireflective layer formed on the second surface of the first transparent substrate,
    wherein the transparent conductive layer has a refractive index between a refractive index of the first transparent substrate and a refractive index of the transparent adhesive layer.

2. The touch screen panel of claim 1, wherein the refractive index of the transparent conductive layer is an average value of the refractive index of the first transparent substrate and the refractive index of the transparent adhesive layer.

3. The touch screen panel of claim 1, further comprising an LCD (liquid crystal display) panel positioned on the touch screen panel.

4. The touch screen panel of claim 3, wherein the LCD panel comprises:
    a first polarizer;
    liquid crystals formed on the first polarizer;
    a second polarizer formed on the liquid crystals; and
    a third antireflective layer formed on the second polarizer.

5. The touch screen panel of claim 1, wherein the first antireflective layer has a refractive index between the refractive index of the first transparent substrate and the refractive index of an air layer.

6. The touch screen panel of claim 1, wherein the second antireflective layer has a refractive index between the refractive index of the second transparent substrate and the refractive index of the air layer.

7. The touch screen panel of claim 4, wherein the third antireflective layer has a refractive index between the refractive index of the second polarizer and the refractive index of the air layer.

8. A manufacturing method of a touch screen panel, the method comprising the steps of:
    forming a transparent conductive layer having an electrode pattern of nanorods on a first surface of a first transparent substrate, the first transparent substrate having a second surface opposite to the first surface;
    forming a transparent adhesive layer on the transparent conductive layer;
    forming a second transparent substrate on the transparent adhesive layer;
    forming a first antireflective layer on the second transparent substrate; and
    forming a second antireflective layer on the second surface of the first transparent substrate,
    wherein the transparent conductive layer has a refractive index between a refractive index of the first transparent substrate and a refractive index of the transparent adhesive layer.

9. The method of claim 8, wherein the refractive index of the transparent conductive layer is an average value of the refractive index of the first transparent substrate and the refractive index of the transparent adhesive layer.

10. The method of claim 8, further comprising the step of positioning an LCD (liquid crystal display) panel on the touch screen panel, with an air layer interposed therebetween,
 wherein the step of positioning the LCD panel comprises the steps of:
 forming a first polarizer;
 forming liquid crystals on the first polarizer;
 forming a second polarizer on the liquid crystals; and
 forming a third antireflective layer on the second polarizer.

11. The method of claim 8, wherein the first antireflective layer has a refractive index between the refractive index of the first transparent substrate and the refractive index of an air layer.

12. The method of claim 8, wherein the second antireflective layer has a refractive index between the refractive index of the second transparent substrate and the refractive index of the air layer.

13. The method of claim 10, wherein the third antireflective layer has a refractive index between the refractive index of the second polarizer and the refractive index of the air layer.

\* \* \* \* \*